United States Patent [19]

Madalinski

[11] 4,344,163
[45] Aug. 10, 1982

[54] RECORD CUEING APPARATUS FOR TURNTABLE TONE ARM

[76] Inventor: Robert S. Madalinski, 5911 Argyle, Dearborn, Mich. 48126

[21] Appl. No.: 188,776

[22] Filed: Sep. 22, 1980

[51] Int. Cl.³ .............................................. G11B 3/10
[52] U.S. Cl. ..................................... 369/40; 369/245
[58] Field of Search .......................... 369/40, 245, 246

[56] References Cited

U.S. PATENT DOCUMENTS

| Re. 25,197 | 7/1962 | Hicks | 369/245 X |
| 2,076,298 | 4/1937 | Harris | 369/245 X |
| 2,969,241 | 1/1961 | Wyrod | 369/245 |
| 4,249,745 | 2/1981 | Dold | 369/245 X |

FOREIGN PATENT DOCUMENTS 481051  3/1937  United Kingdom ................ 369/245

*Primary Examiner*—Charles E. Phillips
*Attorney, Agent, or Firm*—Barnes, Kisselle, Raisch & Choate

[57] ABSTRACT

For use with a phonograph turntable unit having a tone arm and means for lifting the tone arm to a cueing position spaced above the plane of the turntable, a cueing apparatus for laterally positioning the tone arm with respect to the turntable comprising a flag depending from the rearward end of the tone arm and a helical cam spring mounted beneath the flag. The spring is carried so as to engage the flag in the raised position of the tone arm and spaced from the flag in the lowered tone arm position so as to permit free lateral movement of the tone arm in such lowered position. The cam spring is coupled as by cables and/or shafts to an operator knob adjacent the forward edge of the turntable so as to be adapted for manual positioning of the tone arm at a desired lateral position.

5 Claims, 10 Drawing Figures

RECORD CUEING APPARATUS FOR TURNTABLE TONE ARM

The present invention relates to phonograph turntable units, and more particularly to apparatus for cueing the turntable tone arm relative to a phonograph record mounted on the turntable.

In playing phonograph records on a conventional turntable unit, it is sometimes undesirable to position the turntable tone arm and tone arm stylus so as to play a recording track other than the first recording track on the record. This process is termed "cueing" in the art. It is conventional to provide a turntable control which may be manually operated by a user to lift the tone arm in the vertical direction such that the stylus is positioned above the plane of a record carried by the turntable. The arm may then be positioned by hand laterally or horizontally until the stylus is visually located above the unrecorded zone or gap preceding the selected recording track. The tone arm is then lowered by the turntable control until the stylus rests on the record.

It is an object of the present invention to provide apparatus for mechanically cueing the turntable tone arm such that the tone arm need not be touched by a user's hand. It is a further and more specific object of the invention to provide a cueing device of the type described which is adapted for use with a pre-assembled turntable, and is suitable for aftermarket purchase and installation by a turntable owner. Yet another object of the invention is to provide a cueing device of the type described which is economical to assemble, which has a minimum number of moving parts, and which is adaptable to a wide variety of pre-assembled turntable sizes and configurations.

The invention, together with additional objects, features and advantages thereof, will be best understood from the following description, the appended claims and the accompanying drawings in which:

FIG. 2 is a partially exploded perspective view showing the cueing apparatus of FIG. 1 in greater detail;

Figure 1:
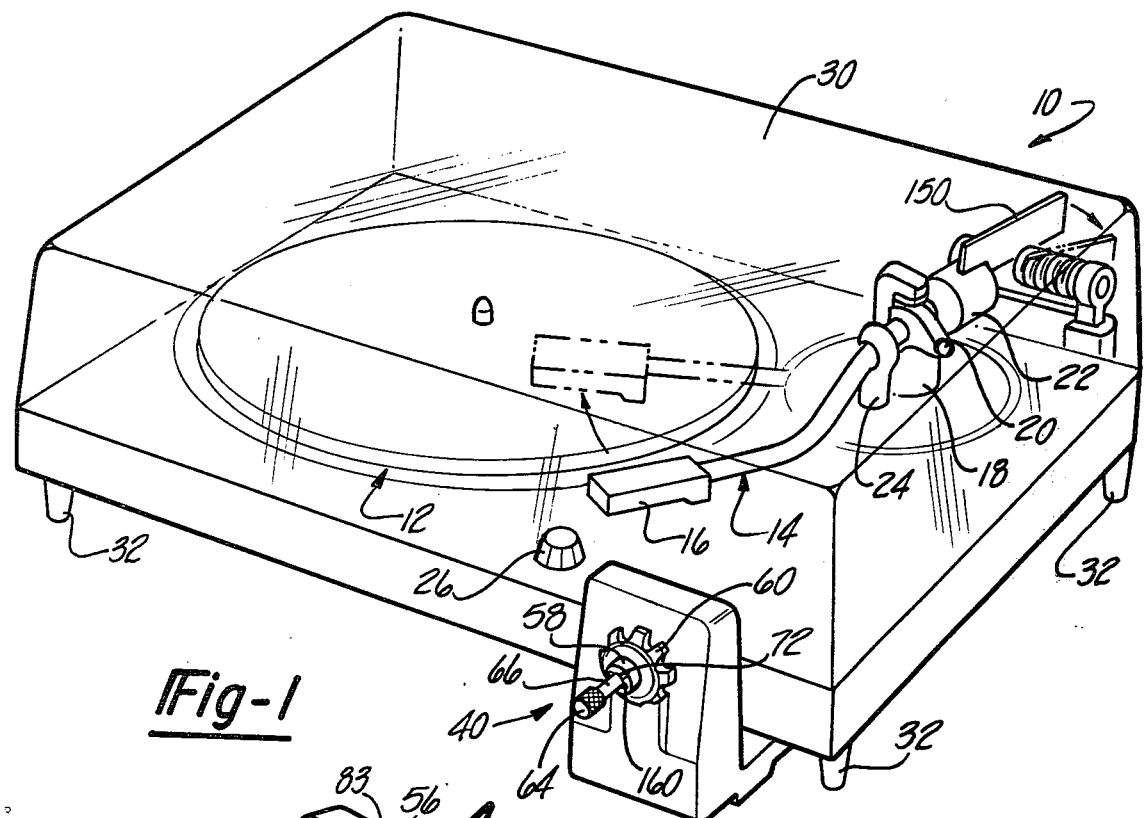
FIG. 1 is a perspective view of a phonograph turntable unit in combination with a presently preferred embodiment of the cueing apparatus in accordance with the present invention.
Figure 3:
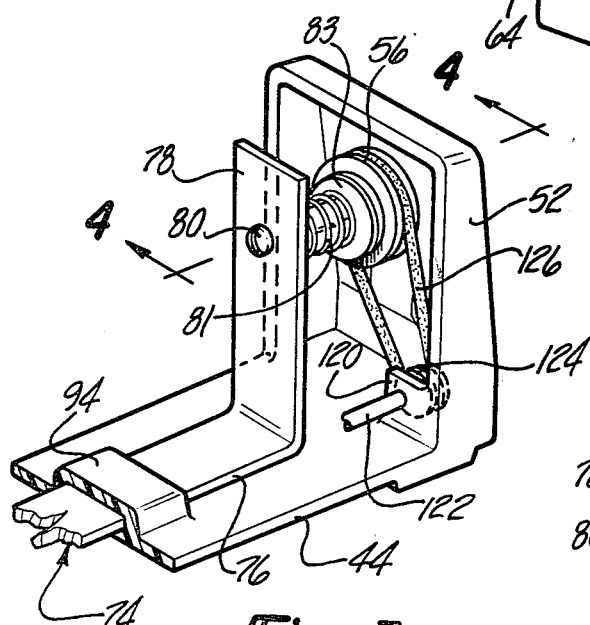
FIG. 3 is a fragmentary perspective view of a portion of the cueing apparatus shown in FIGS. 1 and 2.
Figure 4:
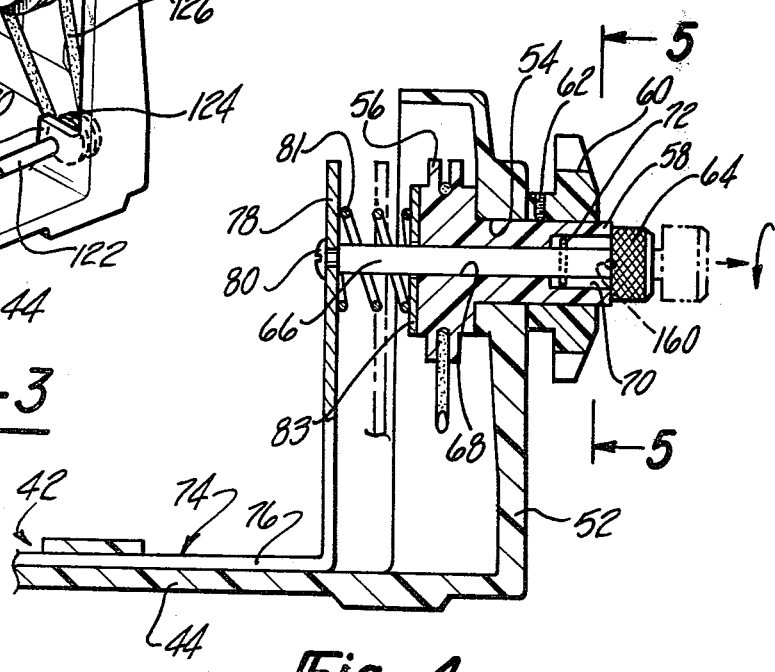
Figure 5:
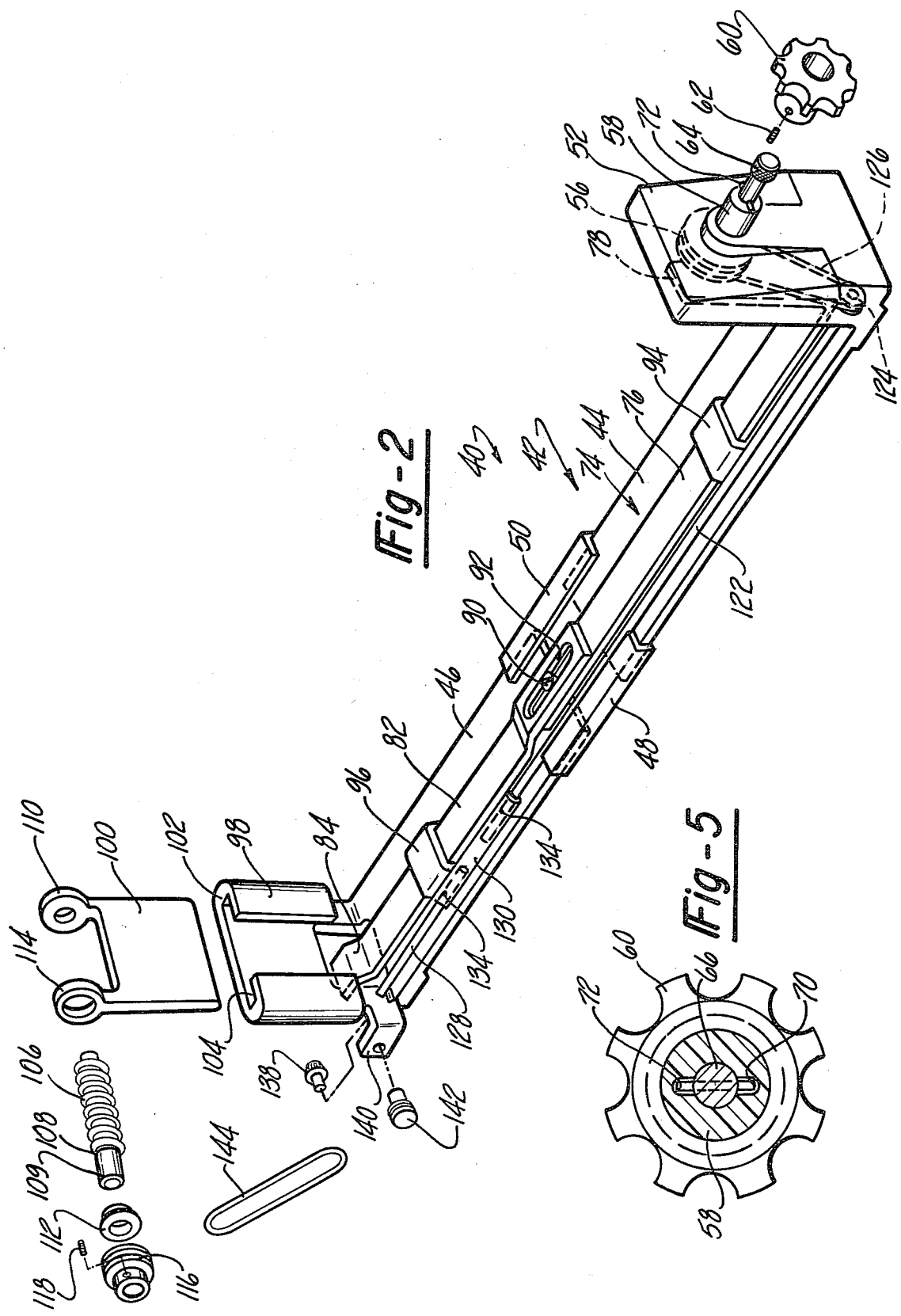
Figures 6, 7:
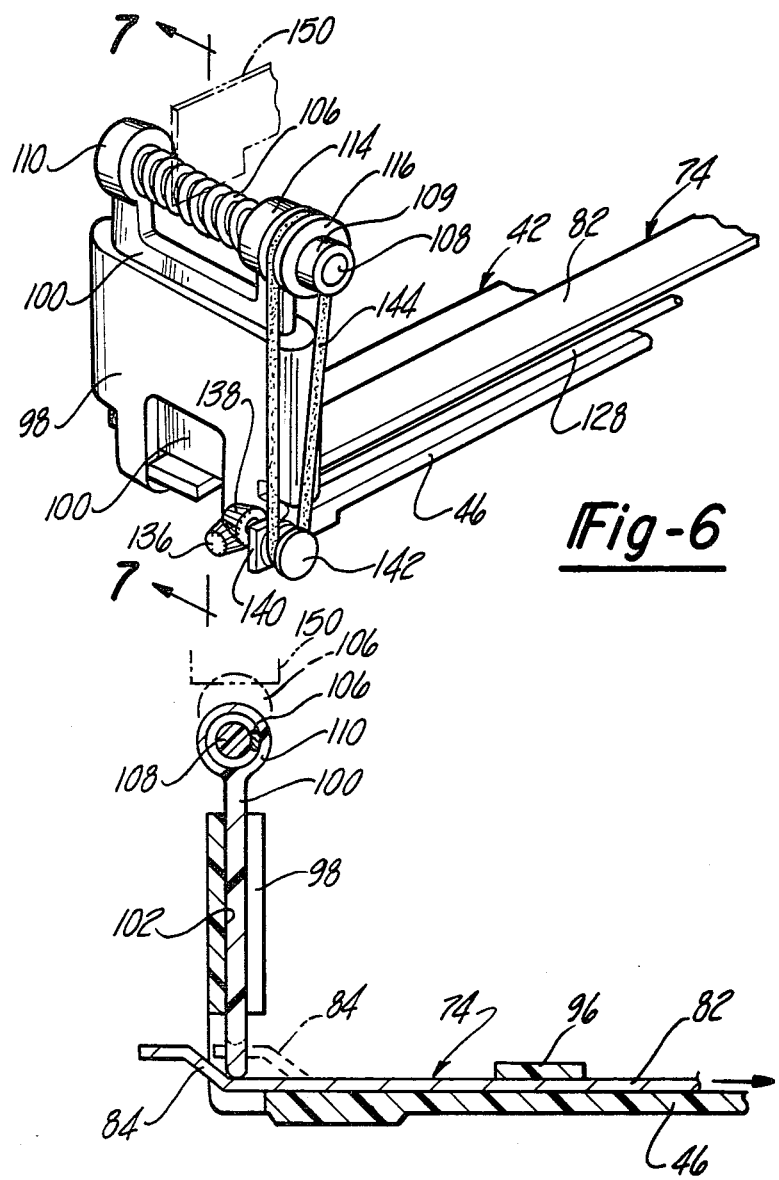
Figure 8:
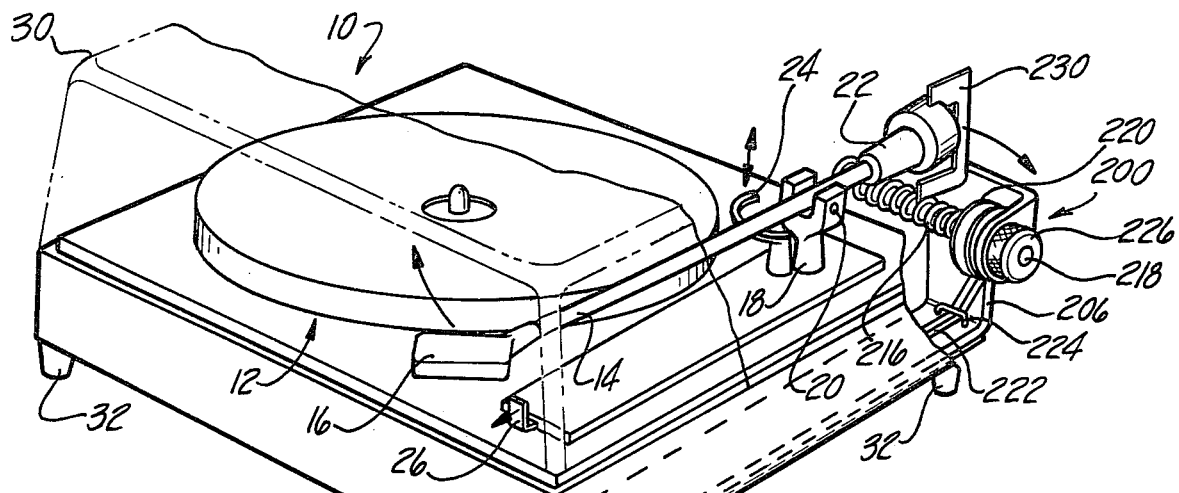
Figure 9:
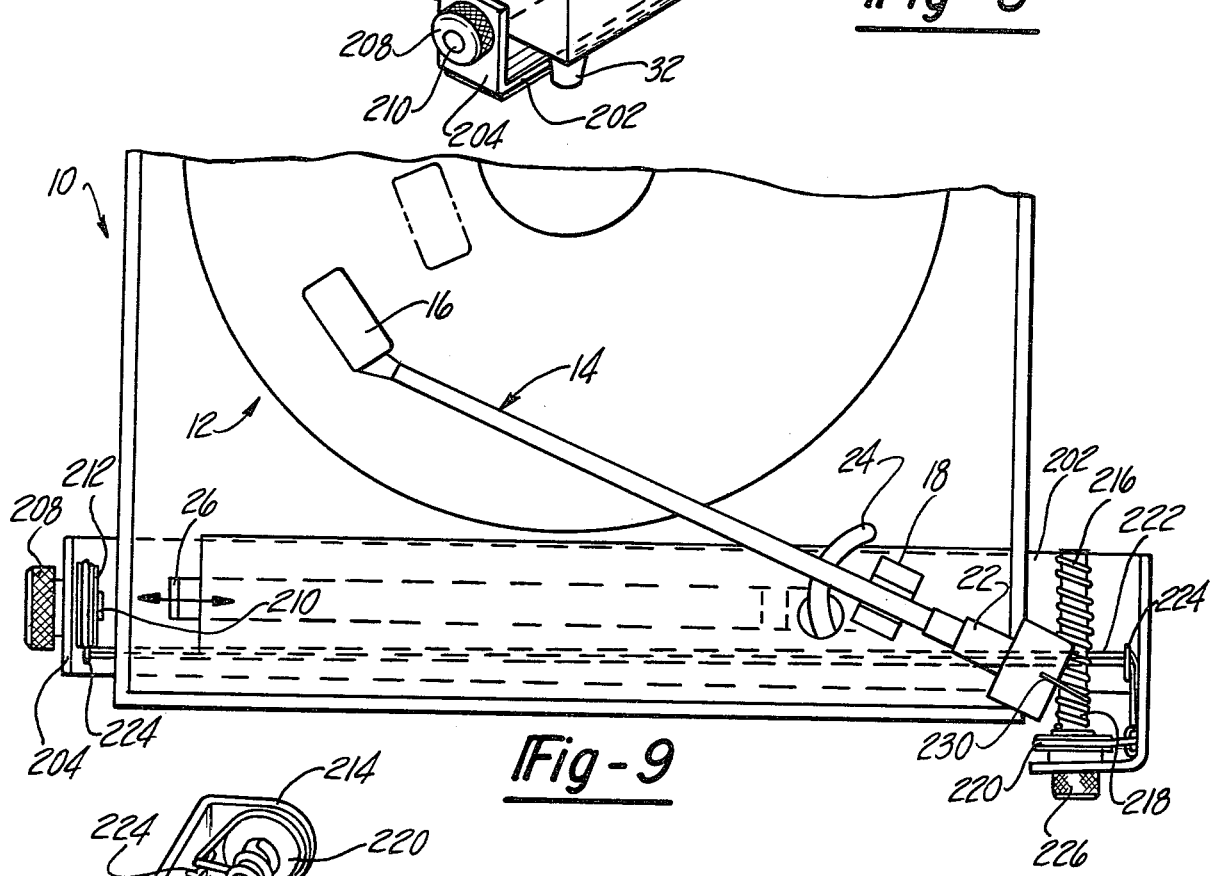
Figure 10:
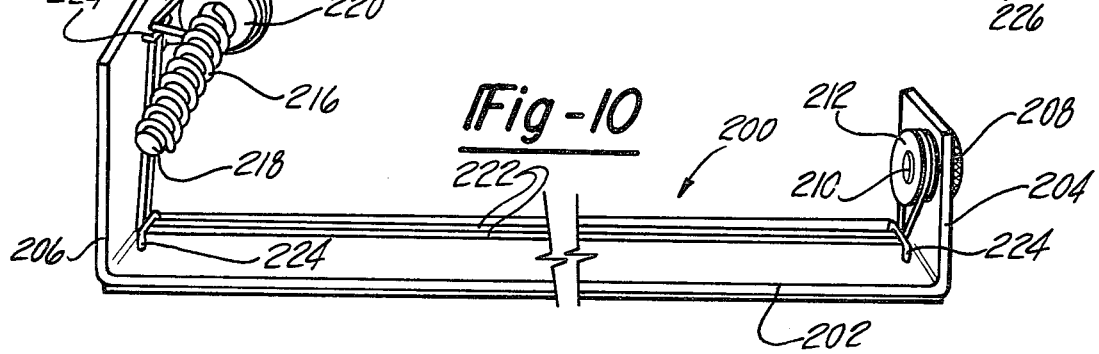

FIGS. 4 and 5 are sectional views respectively taken along the lines 4—4 and 5—5 in FIGS. 3 and 4;

FIG. 6 is a fragmentary perspective view of a portion of the cueing apparatus shown in FIGS. 1 and 2;

FIG. 7 is a sectional view taken along the line 7—7 in FIG. 6;

FIG. 8 is a fragmentary perspective view of a phonograph turntable unit and an alternative embodiment of the cueing apparatus in accordance with the invention;

FIG. 9 is a fragmentary plan view of the turntable and cueing apparatus of FIG. 8; and FIG. 10 is a broken perspective view of the cueing apparatus illustrated in FIGS. 8 and 9.

Referring to FIG. 1, a conventional turntable unit 10 is illustrated as comprising a turntable 12 and a tone arm 14. (In the following description and claims, directional adjectives such as "horizontal", "vertical" and "forward" are taken with reference to conventional disposition of turntable 12 in a horizontal plane with tone arm 14 on the right-hand side of the turntable). A stylus 16 is mounted on the forward end of tone arm 14 and has a needle or the like (not shown) for engaging the grooves of a phonograph record mounted on turntable 12. Tone arm 14 is mounted on a carrier 18 to pivot as about a pin 20 in the vertical direction. A counterweight 22 is mounted at the rearward end of tone arm 14 for substantially balancing the tone arm about the pivotal axis of pin 22. Carrier 18 is itself mounted to pivot the forward end of tone arm 14 horizontally or laterally with respect to turntable 12. A vertically reciprocable saddle 24 is disposed beneath tone arm 14 and is coupled (by means not shown) to a suitable control, such as a handle or knob 26, for selectively raising and lowering tone arm stylus 16 by pivoting tone arm 14 vertically about the axis of pin 20. Thus, control knob 26 and saddle 24 cooperate selectively and manually to reciprocate the tone arm between a raised position above the plane of the turntable 12 and a lowered position for engaging the phonograph record carried by the turntable. Saddle 24 includes an arcuate arm for engaging and supporting tone arm 14 through its entire sweep from a rest position to a position approaching the center of turntable 12 within the inner-most recording track.

It will be appreciated that turntable unit 10 is illustrated semi-schematically in FIG. 1, with only those portions of conventional design being shown which are pertinent to the operation of the invention to be described. It will be noted in particular that tone arm 14 is mounted by carrier 18 to pivot laterally and vertically with respect to turntable 12 about axes intermediate the forward and rearward tone arm ends, such that the rearward end moves in a direction opposite to that of the forward end during pivotal motion in any direction. It will be further understood that slidable lift control knob 26 may be replaced by other suitable lift control mechanisms characteristic of the prior art, such as pivotal or slidable levers, etc. (One prior art lever-type apparatus for raising and lowering the tone arm is shown in detail in Oakley et al U.S. Pat. No. 3,717,350.) A translucent dust cover 30 may cover turntable 10 during and/or between use. Turntable unit 10 is carried above a support surface (not shown) by the legs 32.

A presently preferred embodiment of the cueing apparatus 40 in accordance with the invention is illustrated in combination with turntable 10 in FIG. 1 and in greater detail in FIGS. 2–7. Referring to these figures, cueing apparatus 40 comprises an elongated two-piece base 42 having a generally rectangular front section 44 and a rectangular rear section 46 adjustably joined endwise in a common plane by the opposed C-shaped side channels 48,50 (FIG. 2). Front base section 44 terminates at its forward end in an integral upstanding cup-shaped support 52 having a cylindrical bore 54 (FIG. 4) extending forwardly therethrough on an axis parallel to the plane of base sections 44,46. A pulley 56 is mounted internally of support 52 and has an integral shank 58 extending forwardly and outwardly through bore 54. A serrated knob 60 is mounted on shank 58 and is rotatably coupled thereto by the radially oriented set screw 62 such that shank 58 and pulley 56 rotate in conjunction with knob 60. A knurled knob 64 is mounted on an outer end of a shaft 66 which is slidably and rotatably received telescopically within an axial bore 68 extending coaxially through shank 58 and pulley 56. A slot 70 is formed adjacent the forward end of shank 58 radially intersecting the axis of bore 68 and slidably receives a guide pin 72 extending radially through shaft 66.

A two-piece cam slide 74 is slidably mounted on base plate 42. Cam slide 74 includes a forward section 76 terminating in an upwardly struck flange 78 coupled to the inner end of shaft 66 by the screw 80 rotatably extending through an opening in flange 78 and threaded into the inner end of shaft 66. Flange 78 is loosely captured axially between the head of screw 80 and the inner end of shaft 66 such that shaft 66 and screw 80 are free to rotate with respect to flange 78. Slide section 76 is normally rearwardly biased with respect to support 52, and shaft 66 and knob 64 are normally biased to the position shown in solid lines in FIG. 4, by the coil spring 81 surrounding shaft 66 and captured in compression between flange 78 and the inner face of pulley 56. A bearing washer 83 is disposed between spring 81 and pulley 56.

The rearward section 82 of cam slide 74 terminates in an upwardly struck ramp 84. Cam slide sections 76,82 are adjustably joined lengthwise by a screw 90 received through a slotted opening 92 in the forward end of section 82 and threaded into an opening (not shown) in the rearward end of section 76. Slide 74 is restrained against lateral movement on base 42 by the guides 94,96 respectively integral with base sections 44,46. A rear support flange 98 projects integrally upwardly from the rearward end of base section 46. A generally planar slide 100 is loosely mounted with side edges received in laterally opposed upwardly extending channels 102,104 in support flange 98. Slide 100 rests at its lower end on the rearward portion of cam slide 74 adjacent ramp 84. A coil spring 106 is fixedly mounted on and enclosed a through shaft 108 which has one end rotatably received in an eyelet 110 integrally projecting from an upper edge of slide 100. A bearing collar 112 is received over the enlarged opposing end 109 of shaft 108 and rotatably mounts such shaft in a second eyelet 114 formed integrally with support 100. The lateral axis of eyelets 110,114, and the coincident axis of rotation of shaft 108 and spring 106 therewithin, is perpendicular to the longitudinal dimension of cam slide 42. A pulley 116 is mounted on the end 109 of shaft 108 and is rotatably coupled thereto externally of eyelet 114 by the radially oriented set screw 118 (FIG. 2).

A journal 120 (FIG. 3) projects integrally inwardly and upwardly adjacent the forward end of base section 44 and rotatably supports a drive shaft 122. A pulley 124 is mounted on the forward end of drive shaft 122 and is coupled to pulley 56 (FIGS. 2, 3 and 4) by the endless belt or cable 126. A driven shaft 128 (FIGS. 2 and 6) is rotatably journalled in flange 98 and is adjustably coupled to drive shaft 122 by the sleeve 130 (FIG. 2) and the set screws 134. A bevel gear 136 is mounted to the rearward end of driven shaft 128 externally of flange 98. A second bevel gear 138 is driven by gear 136 and is rotatably coupled through an arm 140 projecting rearwardly from base section 46 to a pulley 142. Pulley 142 is coupled to pulley 116 by the belt 144 which is preferably of elastic material for reasons that will be evident from a discussion to follow. A spring-cam follower in the form of a flag 150 (FIGS. 1, 6 and 7) is mounted on and depends from the rearward end of tone arm 14 (FIG. 1). In the particular embodiment shown in FIGS. 1-7, flag 150 comprises a generally L-shaped blade adhered to tone arm weight 22 so as to project rearwardly and downwardly therefrom toward cam spring 106.

Cueing apparatus 40, including flag 150, is preferably constructed wherever possible of molded plastic materials and purchased as a kit for aftermarket assembly to the turntable 10. The purchaser or user installs the cueing device by first loosening screws 90 and 134 (FIG. 2) and then adjusting base sections 44,46 to the particular depth of his turntable. Screws 90,134 are then tightened, and base assembly 42 is positioned beneath the right-hand side of turntable unit 10 as shown in FIG. 1 so that control knobs 60,64 are positioned adjacent the front edge of the turntable and cam spring 106 is disposed rearwardly of the turntable beneath tone arm weight 22. Flag 150 is then fastened to tone arm weight 22 such that the lower flag edge engages the coils of spring 106 when slide 100 is in the raised position on ramp 84 (solid in FIG. 6 and phantom in FIG. 7) and tone arm 14 is in the raised or cueing position (FIG. 1). Flag 150 may be cut to fit by the user from a section of sheet material provided in the kit, or a plurality of flags of differing sizes may be provided with the kit so that the user may select the particular flag configuration which best suits his particular model of turntable. Obviously, turntables of differing heights may be accommodated by flags 150 of differing dimension and geometry. An opening (not shown) must also be formed in cover 30 to permit engagement of flag 150 with spring 106.

For normal operation of turntable 12, knob 64 is in the withdrawn position shown in solid lines in FIG. 4 and spring slide 100 is in the lowered position (FIG. 7). In operation for cueing a record (not shown) on turntable 12, tone arm 14 is first lifted or pivoted upwardly by cueing knob 26 and saddle 24 to the raised position as previously described. Knob 64 is then withdrawn from shank 58 to the extended position illustrated in solid lines in FIGS. 1 and 2 and in phantom lines in FIG. 4. During such withdrawal, shaft 66 pulls flange 78 and slide sections 76,82 forwardly of the cueing device, such that ramp 84 engages and lifts support 100 from the lowered position illustrated in solid lines in FIG. 7 to the raised position, illustrated in phantom lines in FIG. 7 and in solid lines in FIGS. 1 and 6, wherein flag 150 engages the coils of cam spring 106. Preferably, flag 150 is sufficiently flexible to insure nesting between spring coils without jamming. Knob 64 and shaft 66 are rotated ninety degrees with respect to shank 58 in the fully withdrawn position until pin 72 is aligned with a detent slot 160 (FIG. 4) extending across the outer face of shank 58 transversely of slot 70, at which position knob 64 is released. Pin 72 and slot 160 thereafter cooperate with spring 81 for holding or locking knob 64 and shaft 66 in the described withdrawn position. Knob 60 may then be rotated by the user so as to drive cam spring 106 in the desired direction through belt 126, shafts 122,128, gears 136,138 and belt 144.

With the tone arm thus in the raised or cueing position and flag 150 engaging cam spring 106, the operator may rotate knob 60, while observing the position of the forward end of the tone arm until the stylus is in a desired lateral position above a record on turntable 12, whereupon the tone arm may be lowered. Most preferably, such visual observation is facilitated by placing an optical light source adjacent the forward end of the tone arm so as to illuminate the portion of the record surface with a focused beam immediately beneath the tone arm stylus. It will be noted that the cueing device 40 illustrated in the drawings does not affect or inhibit automatic cueing or return of the tone arm at the beginning and end of record play. Since the cam spring 106 is normally positioned beneath the cueing position of flag 150 and only engages flag 150 when slide 100 is raised by withdrawal of knob 64 and shaft 66 as previously described, such knob and shaft should only be in the withdrawn position during an actual cueing operation and following completion of such operation should be returned to the normal fully retracted position. It will also be noted that the described spring-biased detent locking of shaft 66 in the withdrawn position permits the cueing operation to be performed using only one hand. Upon completion of the cueing operation, knob 64 may be withdrawn slightly against the force of spring 81 so as to disengage pin 72 and slot 160, rotated ninety degrees until pin 72 is aligned with slot 70, and then released such that spring 81 operates to return device 40 to the normal position.

An alternative embodiment 200 of a cueing apparatus in accordance with the invention is shown in FIGS. 8-10 and comprises an elongated one-piece base plate 202 having upwardly struck parallel integral flanges 204,206 at the forward and rearward base plate ends. A knurled knob 208 is rotatably mounted externally of flange 44 and is drivably coupled by a shaft 210 to a pulley 212 carried adjacent the inside face of flange 204. An ear 214 integrally projects laterally and forwardly from the upper outside or right-hand edge of rear flange 206, with the plane of ear 214 being perpendicular to the plane of the rear flange. A helical cam 216 comprising a coil spring is rotatably mounted internally of ear 214 by a cantilevered laterally projecting shaft 218. A pulley 220 is drivably mounted on shaft 218 internally adjacent ear 214 and is rotatably coupled to pulley 212 by the endless cable 222. Cable 222 is constructed to extend along flange 206 and base plate 202 by the cable-encompassing staples 224. A knurled knob 226 is drivably mounted to shaft 218 externally adjacent ear 214. A cam follower comprising a flag 230 is mounted on and depends from the rearward end of tone arm 14. In the particular embodiment shown in the drawing, flag 230 comprises a C-shaped blade adhered to tone arm weight 22 so as to project rearwardly and downwardly from the tone arm toward cam spring 216.

Operation of the alternative embodiment of FIGS. 8-10 will be evident from the previous discussion with reference to the preferred embodiment. In the particular alternative arrangement shown in the drawings, cam spring 216 is of a length and is positioned relative to tone arm weight 22, and flag 230 is attached to tone arm weight 22, so that the flag and cam spring will interengage when the tone arm is raised at any lateral position of the tone arm. In some turntable units, automatic cueing means are provided internally of the turntable for moving the tone arm from a rest position to a position corresponding to the first recording channel of a 33 rpm record, etc. For turntable units with such automatic first-channel cueing capability, it would be preferable to locate spiral cam spring 216 and flag 230 relative to each other so that the flag and spring do not become interengaged in the raised position of the tone arm until the tone arm is over the first recording channel. This may be accomplished by positioning the flag at the extreme left-hand edge of the tone arm weight 22 (as viewed from the front of the turntable), and/or by adjustably positioning the cantilevered left-hand edge of the cam spring to correspond with the first recording channel of a standard record. The latter may be accomplished upon installation by a purchaser by positioning the cueing device assembly 200 in a desired position, temporarily positioning the flag on the tone arm weight and then manually moving the tone arm to the first record channel (with the turntable de-energized). The position of the flag relative to the cam spring is then noted and the spring terminated at the so-noted position using wire cutters or the like. The flag may then be permanently attached to the tone arm so as to engage the cantilevered free end of the cam spring when the tone arm is at the first recording channel.

Although manual cam-operating means such as knobs 60 (FIGS. 1–7) and 208,226 (FIGS. 8–10) are preferred for simplicity of operation, it is contemplated within the invention in its broadest aspects to provide a manually actuated reversible motor or the like coupled to the cam-spring drive shaft. It is also envisioned within the broadest aspects of the invention that the helical cam and cam-following flag may be built into the turntable unit by an original equipment manufacturer. In such a modification, all cueing knobs and/or levers should be located on the front of the turntable unit so that all cueing operations may be done with cover 30 in place. The invention is intended to embrace the above-noted and all other alternatives, modifications and variations as fall within the spirit and broad scope of the appended claims.

The invention claimed is:

1. For use with a phonograph turntable unit of the type comprising a turntable, a tone arm having a forward end with a stylus for engaging a phonograph record on said turntable and a rearward end, means mounting said tone arm to pivot both vertically and laterally with respect to said turntable about axes intermediate said forward and rearward ends, and means for selectively pivoting said tone arm vertically with respect to said turntable between a raised position of said forward end about said turntable and a lowered position for engaging a phonograph record on said turntable, cueing apparatus for laterally positioning said forward end of said tone arm in said raised position comprising an elongated base adapted to extend beneath a turntable unit from a forward edge to a rearward edge beneath said rearward end of said tone arm, a first support upstanding from said forward edge and a second support upstanding from said rearward edge, a first knob rotatably mounted on an outer side of said first support and a first pulley mounted on an inner side of said first support, cam means comprising a coil spring, means mounting said coil spring on said rear support to rotate about an axis transverse to the elongated dimension of said base and a second pulley rotatably coupled to said spring, means extending along said base beneath the turntable rotatably coupling said first and second pulleys for selectively rotating said coil spring in either direction about said axis, and cam follower means mounted on said rearward end of said tone arm for operatively engaging said cam means in said raised position of said forward end so as to translate said rearward end and thereby pivot said forward end laterally with respect to said turntable and being spaced from said cam means in said lowered position of said forward end so as to permit free lateral movement of said forward end in said lowered position.

2. The cueing apparatus set forth in claim 1 wherein said base is adjustable in the direction of its elongated dimension.

3. The cueing apparatus set forth in claim 2 wherein said second support means includes first means affixed to said base and second means slidably mounting said spring on said first means for vertical movement beneath said rearward end of said tone arm, and wherein said apparatus further comprises manually operable means carried by said first support means adjacent to said first knob and means operatively coupling said manually operable means to said second means for selectively raising and lowering said spring beneath said rearward end of said tone arm.

4. The cueing apparatus set forth in claim 3 wherein said manually operable means comprises a second knob, a shaft coupled to said second knob telescopically carried by said first knob, said shaft being slidable axially within said first knob between a first position wherein said second knob is adjacent to said first knob and a second position wherein said second knob is spaced axially outwardly of said first knob, and wherein said means operatively coupling said manually operable means to said second means comprises cam slide means having a first portion extending along said base, a second portion coupled to said shaft and a third portion including means defining a cam ramp disposed beneath said second means.

5. The cueing apparatus set forth in claim 4 wherein said shaft is rotatable within said first knob, and wherein said apparatus further comprises means for locking said second knob and said shaft in said second position comprising means providing a radial slot in said first knob, a pin extending radially through said shaft and slidable in said slot as said shaft is moved from said first position toward said second position, a detent slot in an outer face of said first knob at an angle with respect to said slot and spring means normally biasing said shaft and second knob toward said first position.

* * * * *